Patented Mar. 14, 1933

1,901,129

UNITED STATES PATENT OFFICE

HENRY B. SMITH AND STEWART J. CARROLL, OF ROCHESTER, NEW YORK, ASSIGNORS TO EASTMAN KODAK COMPANY, OF ROCHESTER, NEW YORK, A CORPORATION OF NEW YORK

CELLULOSIC COMPOSITION OF MATTER CONTAINING PHENYL STEARATE

No Drawing.    Application filed June 25, 1931.  Serial No. 546,910.

This invention relates to compositions of matter in which cellulose derivatives, such as cellulose nitrate, are combined or mixed with other substances, such as a compatible plasticizer, and a common solvent for both, with or without other useful addition agents, so that the resulting products will have properties such as will make the composition highly advantageous for use in the plastic and analogous arts, such, for instance, as the manufacture of wrapping sheets or tissues, photographic film, artificial silk, molding compounds or products, varnishes or lacquers and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, substances or surfaces with which it is associated during manufacture. Other objects will become apparent to those skilled in the art to which this invention pertains.

While cellulose nitrate has been known for decades, it has also been known that to utilize it in the various plastic arts it is necessary to mix therewith such plasticizing or conditioning agents as camphor, castor oil, triphenylphosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose nitrates to prepare them for use in the other plastic arts, such as in the manufacture of lacquers, varnishes, artificial silk filaments, molded compounds and the like. While the plasticizers or other addition agents heretofore discovered have had their utility in the art, the increasing use to which cellulose derivatives have been put and the increasing number of desirable properties required of the cellulose derivatives for most purposes has made the discovery of new and economical plasticizers or other addition agents a matter of considerable importance to the art.

We have discovered that valuable properties may be induced in and/or contributed to compositions containing cellulose derivatives, such as cellulose nitrate, by adding thereto the plasticizing compound phenyl stearate together with a solvent which will dissolve both the cellulose derivative and the plasticizer. This plasticizer has the formula

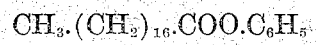
$$CH_3.(CH_2)_{16}.COO.C_6H_5$$

It is compatible with cellulose derivatives and particularly compatible with cellulose nitrate in the percentages hereinafter given. It can be obtained upon the open market, and can be prepared as follows:

A mixture of 2,200 g. of stearic acid, 2,200 cc. of carbon tetrachloride, and 1,320 g. of thionyl chloride is heated gently on a steam bath in a 12-liter flask under a reflux condenser for several hours. When the reaction is finished, there is no further evolution of hydrochloric acid or sulfur dioxide. A solution of 1,150 g. of freshly distilled phenol in 1,150 cc. of carbon tetrachloride is then added through a dropping funnel and refluxing continued until no further hydrochloric acid is evolved. The carbon tetrachloride is then distilled from a steam bath under reduced pressure, and the residue is distilled under reduced pressure. It boils at 242°–247° C. under 12 mm. pressure.

The particularly useful properties which it induces in or contributes to a cellulosic composition containing it are hereinafter enumerated.

In order that those skilled in this art may better understand our invention we would state, by way of illustration, that for the manufacture of photographic film or other sheets our new composition of matter may be compounded according to the following formula:

| | Parts |
|---|---|
| Cellulose nitrate | 100 |
| Butyl alcohol | 40 |
| Phenyl stearate | 30 |
| Alcohol or acetone | 300 to 500 |

The amount of plasticizer may be decreased or increased, depending upon whether it is desired to decrease or increase, respectively, the properties which this plasticizer contributes to the finished product. The amount of solvent applied may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. Film so produced has permanently brilliant transparency, and is exceedingly tough and flexible. Its initial flexibility, as shown by the number of folds it will withstand upon a modified Schopper fold-tester (commonly used for such purposes) without breaking, is from two to ten times as great as that of a film plasticized with camphor. After being subjected for as long as 250 days to air kept at a temperature of 65° C., it still maintains the same ratio of flexibility to a film plasticized with camphor and subjected to the same treatment. This demonstrates that a film plasticized with phenyl stearate will withstand ordinary usage satisfactorily for many years.

Other solvents (instead of acetone or alcohol) which are compatible with cellulose nitrate and our new plasticizer may occur to those skilled in the art. In like manner, other plastic inducing agents, such as amyl alcohol, may be used in place of butyl alcohol. These, of course, do not alter the scope of our invention.

Inasmuch as our above-described composition of matter is quite useful in the production of films and sheets, it will be apparent that our new plasticizer may also be employed with advantage in the other branches of the plastic art. It may be desired to employ a composition of different viscosity or evaporation characteristics, but this is a mere matter of changing the solvent proportion or adding evaporation retardants or other high or intermediate boiling constituents, as has been well known in the art for more than a decade. Our novel plasticizer may also be employed with advantage in connection with a number of the known lacquer and varnish formulæ with which it may be found to be compatible. In such cases the plasticizer is usually first put into solution with the cellulose derivative solution, and if nonsolvents are added for the purpose of cheapening the composition, they are added only to such an extent as will not precipitate the derivative from solution. Also the plasticizer is usually employed in larger amounts, such as from 50 to 60 parts, in compounding lacquers. Other uses within the scope of our invention will also suggest themselves to those skilled in the art and are to be included within the scope of the claims appended hereto.

What we claim as our invention and desire to be secured by Letters Patent of the United States is:

1. A composition of matter comprising a cellulose derivative and phenyl stearate.

2. A composition of matter comprising nitrocellulose and phenyl stearate.

3. A composition of matter comprising 100 parts nitrocellulose and from about 10 to 50 parts, by weight, of phenyl stearate.

4. A relatively thin sheet comprising 100 parts of nitrocellulose and approximately 15 to 30 parts, by weight, of phenyl stearate.

Signed at Rochester, N. Y., this 16th day of June, 1931.

HENRY B. SMITH.
STEWART J. CARROLL.